(12) United States Patent
Leahy

(10) Patent No.: US 9,523,783 B2
(45) Date of Patent: Dec. 20, 2016

(54) METHOD AND SYSTEM FOR PRESENTING SEISMIC INFORMATION

(71) Applicant: Roxar Software Solutions AS, Stavanger (NO)

(72) Inventor: Garrett Leahy, Stavanger (NO)

(73) Assignee: Roxar Software Solutions AS, Stavanger (NO)

( * ) Notice: Subject to any disclaimer, the term of this patent is extended or adjusted under 35 U.S.C. 154(b) by 444 days.

(21) Appl. No.: 14/096,542

(22) Filed: Dec. 4, 2013

(65) Prior Publication Data

US 2014/0163890 A1 Jun. 12, 2014

(30) Foreign Application Priority Data

Dec. 6, 2012 (NO) .................................. 20121471

(51) Int. Cl.
*G01V 1/34* (2006.01)
*G01V 1/30* (2006.01)

(52) U.S. Cl.
CPC ............... *G01V 1/345* (2013.01); *G01V 1/302* (2013.01); *G01V 1/307* (2013.01); *G01V 2210/64* (2013.01); *G01V 2210/665* (2013.01); *G01V 2210/667* (2013.01)

(58) Field of Classification Search
CPC ...................................................... G01V 1/345
USPC .......................................................... 702/16
See application file for complete search history.

(56) References Cited

U.S. PATENT DOCUMENTS

| 5,539,704 | A | 7/1996 | Doyen et al. |
| 5,638,269 | A | 6/1997 | Fournier et al. |
| 7,193,932 | B2 * | 3/2007 | Chamberlain ........... G01V 1/22 367/76 |
| 7,206,782 | B1 | 4/2007 | Padgett |
| 7,519,476 | B1 * | 4/2009 | Tnacheri .................. G01V 1/30 702/11 |
| 2002/0188406 | A1 | 12/2002 | Nivlet et al. |
| 2005/0007876 | A1 | 1/2005 | Castagna et al. |
| 2010/0186950 | A1 | 7/2010 | Neelamani et al. |

(Continued)

FOREIGN PATENT DOCUMENTS

| WO | WO-2004070531 A2 | 8/2004 |
| WO | WO-2012154912 A2 | 11/2012 |

OTHER PUBLICATIONS

Rankey, E.C., et al., "That's why its called interpretation: Impact of horizon uncertainty on seismic attribute analysis", The Leading Edge, Sep. 2003, pp. 820-828.

(Continued)

*Primary Examiner* — Bryan Bui
(74) *Attorney, Agent, or Firm* — Winstead PC

(57) ABSTRACT

The present invention relates to a system mapping geological formations related to seismic studies comprising interrogation means for sampling information from geological features in a mapped area, e.g. through seismic sampling methods, the sampled information being stored in association with a position related to the sampled information providing a mapping of the area, wherein the system also comprises analyzing means for obtaining attribute information related to the sampled information in each position and storing said attribute information associated to said positions so as to provide an ensemble of attribute values related to the mapped area subject to the seismic studies.

12 Claims, 4 Drawing Sheets

(56) References Cited

U.S. PATENT DOCUMENTS

2010/0200744 A1\* 8/2010 Pearce ................... G01V 8/16
250/268
2011/0213556 A1 9/2011 Yu et al.
2011/0307438 A1 12/2011 Fernandez Martinez
2012/0090843 A1\* 4/2012 Vagapov ............ E21B 31/1135
166/301

OTHER PUBLICATIONS

Guillou, Olivier, et al., "Hydrocarbonate Reservoir Characterization Constrained to Seismic Attributes", Society of Petroleum Engineers, 2010, 8 pages.

Mukerji, Tapan, et al., "Statistical rock physics: Combining rock physics, information theory, and geostatistics to reduce uncertainty in seismic reservoir characterization", The Leading Edge, Mar. 2001, pp. 313-319.

Loures, Luiz G., et al., "Petrophysical Reservoir Characterization and Uncertainty Analysis", 2003, 10 pages.

Sylta, Øyvind, "Analysing exploration uncertainties by tight integration of seismic and hydrocarbon migration modelling", Petroleum Geoscience, vol. 14, 2008, pp. 281-289.

Wellmann, J.F., et al., "Towards Incorporating Uncertainty of Structural Data in 3D Geological Inversion," Tectonophysics (2010), pp. 141-151.

He, Tao, et al.; "The Uncertainty Analysis of the Key Factors that Affect the AVO Attributes in Sandstone Reservoir"; Chinese Journal of Geophysics, vol. 54, No. 3; May 2011; pp. 375-383.

\* cited by examiner

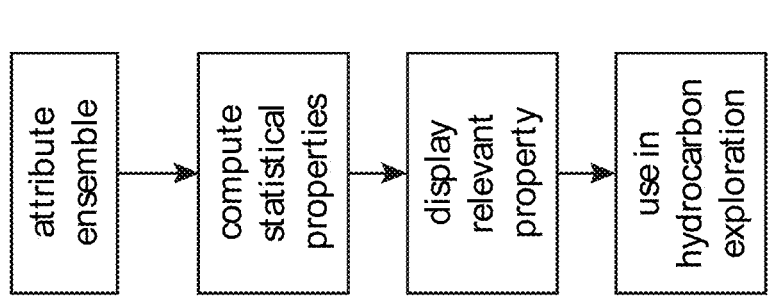

METHOD AND SYSTEM FOR PRESENTING SEISMIC INFORMATION

BACKGROUND

Field of the Invention

This invention relates to a method and system for presenting seismic information sampled from geological formations.

History of the Related Art

Seismic studies represent an important means for mapping geological formations, for example for finding hydrocarbon resources or water reservoirs, by transmitting vibrations into the formations and detecting their reflections and refraction and in some cases transformations from pressure waves to shear waves.

These studies include large amounts of data using complex algorithms to provide a three dimensional map of the geological formations, where each point in the map is calculated based on the seismic data. After this process the operators interpret the map manually and based on their knowledge try to detect the promising geological structures possibly containing hydrocarbons or other resources.

Geophysical interpretation conventionally yields a single scenario for the configuration of subsurface geobodies such as faults and horizons, whereas the data generally support many possible interpretations. These interpretations are used for sophisticated analyses (Attribute Analysis) in which different properties of the data are explored, for example, the amplitude of seismic reflectors. Because conventional workflows only support a single model of many, attribute analysis results in only one instance of many. In general much work has been done in reducing the uncertainty of the data.

Several publications are known discussing the uncertainty of attribute data. Fournier et al (U.S. Pat. No. 5,638,269) describe a method for deducing geologic properties from seismic trace data. This method relies on obtaining calibration from local geologic data as measured in wells and seismic attributes obtained from data measured near the given wells. The relationship is then applied to the full seismic volume. Neelamani and Converse (US2010/0186950) describe a method for interpreting geologic features using attributes based on curvelet transforms of seismic data. While the authors discuss the calculation of multiple attributes based on a given curvelet transform of the data. Zhou and Ahmed (US2011/0213556) describe a method for seismic processing based on attributes. Unfortunately, it requires a waveform matching algorithm in order to reduce noise in the resulting seismic data. Neither of these methods relate to uncertainty of the attribute as such.

Fernandez (US2011/0307438) discloses a method for analyzing data in systems that have many variables (high-dimensional space). The method relies on reducing the dimensionality of the space to solve the problem more efficiently. Uncertainty as estimated in this disclosure represents the uncertainty in the lower/reduced dimensionality space, rather than the uncertainty associated with an attribute.

Rankin and Mitchel "Interpreter's Corner—That's why it's called interpretation: Impact of horizon uncertainty on seismic attribute analysis" The Leading Edge 22, 820 (2003) attempt to isolate the impact of interpretations on seismic attribute analysis. They perform a study in which six individual interpreters were asked to perform an interpretation of a single pinnacle reef structure in seismic data. An analysis of the impact of the variability in the interpretation results on seismic attributes as used to infer rock properties is performed. The authors instead suggest that their study implies that several interpretations could be used to generate end-member scenarios for risk assessment, and that these can be supplemented via subsequent geologic modeling. However, this study is deterministic and does not consider the probability of occurrence of a given attribute given a range of interpretations.

Several authors present methods for obtaining posterior distributions from simulations of subsurface models using rock physics relationships (for example, Sylta "Analysing exploration uncertainties by tight integration of seismic and hydrocarbon migration modeling" Petroleum Geoscience, August 2008, v. 14:219-221; Guillou et al "Hydrocarbonate reservoir characterization constrained to 3D seismic attributes" 2010; Mukerji et al: "Statistical rock physics: Combining rock physics, Information theory, and geostatistics to reduce uncertainty in seismic reservoir Characterization" MARCH 2001 THE LEADING EDGE 313.; Doyen and Den Boer: U.S. Pat. No. 5,539,704; Loures and Moraes: "Petrophysical Reservoir Characterization and Uncertainty Analysis", 2003). In these cases, there is an inherent and acknowledged uncertainty associated with relating the seismic data (amplitude and phase) to lithology and fluid content based on the physical response of the rocks. The authors use different techniques to explore this uncertainty, combining forward modeling (simulation) and known relationships to obtain distributions of predicted lithology parameters. Unfortunately, these methods require sophisticated forward models, detailed lithology information from existing wells, and most importantly, ignore uncertainty in the data and the physical response. They are therefore unsuited towards producing ensembles of geophysical attributes for statistical analysis.

Wellmann, F. J. et al: "Towards incorporating uncertainty of structural data in 3D geological inversion" Tectonophysics (2010), N. 124902, discloses a method for generating multiple realizations of subsurface structure via simulation and optimization. As discussed in section 1.1, these realizations are described as mathematical functions, which are constructed via locations and attidutes (e.g., dip) of measured data. This set of multiple realizations of subsurface structure (faults, horizons, etc) are considered as an input to the method according to the present invention. The geobody ensemble (consisting of multiple realizations of a geobody) is input to our invention. While Wellmann provides a method for obtaining said geobody ensemble, it does not analyze the ensemble via an attribute function, and does not produce an ensemble of attribute realizations that can be statistically analyzed.

US 2005007876 discusses a method for determining fluid properties via inversion of seismic attribute data. The method may use multiple attribute maps; however, these attribute maps are for a single configuration of a horizon of interest (see 0018, FIG. 1). It is common practice in the industry that many different types of attributes be calculated from seismic data, and that is not the subject of our invention. It does not consider the use of an ensemble of horizons for each particular attribute map, nor does it generate an ensemble of attribute maps based on an input ensemble of horizon configurations.

SUMMARY

Thus it is an object of the present invention to provide a means to handle the uncertainty related to the geophysical data. This is obtained as specified in the accompanying claims.

The present solution thus allows the interpreter to visualize a number of different possible geobodies. This can be used to sample the model space where attribute analysis is performed, creating an ensemble of geobodies that satisfy the data. This ensemble can be used to calculate attributes, providing a distribution of possible results and their associated probabilities.

BRIEF DESCRIPTION OF THE DRAWINGS

The invention will be described below with reference to the accompanying drawings, illustrating the invention by way of examples.

FIG. 2 illustrates the generalized workflow for use of ensemble attributes in resource extraction FIGS. 3a,b illustrates the posterior attribute distribution and cumulative distribution function.

DETAILED DESCRIPTION

Interpretation is performed in general on seismic data, and this invention pertains mainly to the interpretation of seismic data. However, this invention is generally applicable to the interpretation of all data or maps of the subsurface.

In conventional seismic interpretation, the user aims to map horizons and faults in the subsurface. This is achieved by the user looking at seismic data and marking a point ("pick") where a reflection of seismic energy may indicate the presence of an impedance contrast ("horizon") in the Earth. Discontinuities in horizons may reflect structural deformation and can be interpreted as faults. Faults are picked similarly to horizons, where a point is marked where the interpreter believes the fault crosses a horizon.

Figure 1:
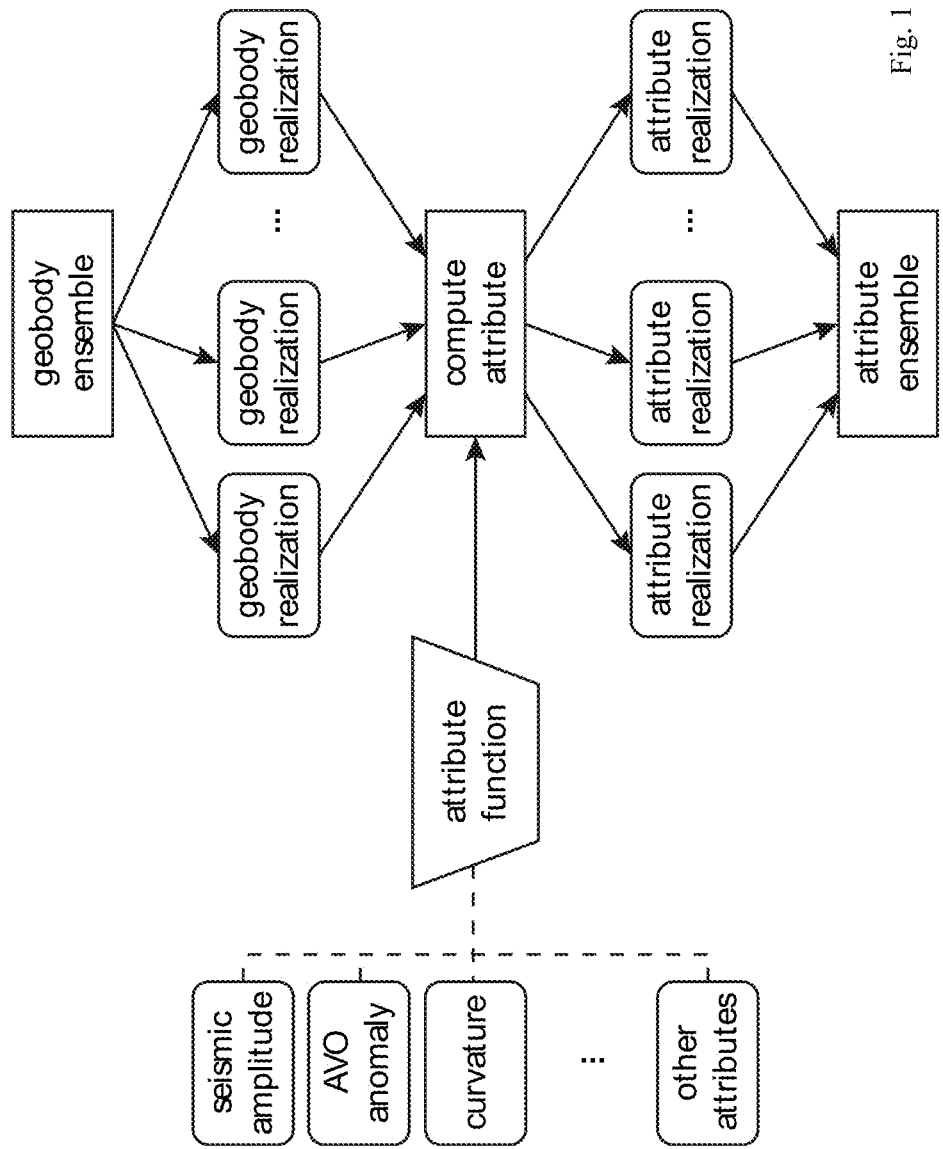
FIG. 1 illustrates a flow chart for illustrating the implementation of the ensemble attribute information into the geobodies according to the invention.

When the mapping is complete, the collection of geobodies (horizons, faults, etc) is used to build a subsurface model as is illustrated in FIG. 1. This step according to the invention involves the analysis of one or more "attributes" associated with one or more geobodies. For example, a typical attribute in seismic data is a map of the amplitude of reflection following a particular horizon. Other attributes may be the thickness (in time or depth) of a particular interval between two horizons, amplitude vs offset (AVO), curvature etc. These attributes are instrumental in the search for hydrocarbons, as they can provide clues regarding the geology, environment of deposition, and even fluid content for porous formations.

Further, conventional work flows yield at best a single model ("best-estimate") for subsurface structure. Unfortunately, it is widely established that there is uncertainty inherent in the data. For example, with a conventional seismic bandwidth it is impossible to determine interface locations in time to more than ~1/30 seconds. This may translate into uncertainties in the final structural model, and therefore in the attribute analysis. These uncertainties are not captured by conventional workflows.

The method described here assumes that uncertainty information can be collected and paired with an interpreted geobody, where the geobody is defined as a horizon, fault, etc in the geological formation. We propose that the uncertainty associated with given measurements be used to generate an ensemble of geobodies, where each individual realization of a geobody is derived from the base interpretation, subject to the measured uncertainty parameter. Thus an attribute ensemble is obtained comprising a number of possible realizations of the geobody This is then considered the base input for Ensemble Attribute Analysis as illustrated in FIG. 2.

The generation of such an ensemble is taught by many authors in prior art, for example in the optimization literature (i.e., Monte Carlo Simulation, Genetic Optimization, etc), and it is presumed that such an ensemble could be generated subject to any number of constraints (i.e., regularization, data misfit, damping, etc.). However, ensembles may be obtained in other ways as well. These might include multiple interpretations of the same feature by different (or the same) interpreters, who bring different preconceptions and bias to their interpretations (as discussed by Rankin and Mitchell, 2003). Alternatively, in seismic interpretation computer-assisted picking of geobodies is frequently performed ("auto-tracking"). These features require a seed point and parameterizations upon implementation. An ensemble of interpreted horizons might be generated by varying the auto-tracking parameters while maintaining the seed point. Given an ensemble, each particular realization of a geobody or collection of geobodies is used to produce an attribute value according to a designated fit-for-purpose algorithm. The collection of attribute values therefore also represents an ensemble. The distribution of attribute values associated with this ensemble is then analyzed in order to obtain a posterior distribution of attribute values as illustrated in FIGS. 3a,3b.

For example, consider a seismic amplitude extraction as performed on an ensemble of possible horizon configurations. For a single seismic trace, the seismic amplitude of the trace is chosen at the location where each horizon crosses the trace. This provides a set (ensemble) of seismic amplitudes associated with the ensemble of horizon configurations. This ensemble represents the posterior distribution of seismic amplitude at this trace, and may be analyzed statistically; for example, a probability distribution may be plotted showing the relative probability of a given seismic amplitude being sampled by the ensemble (FIG. 3a).

Figure 3B:
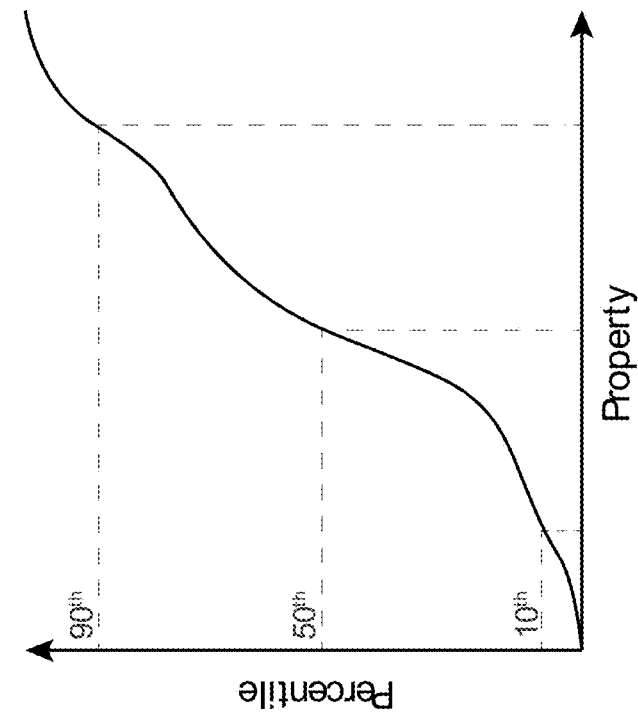
Figure 3A:
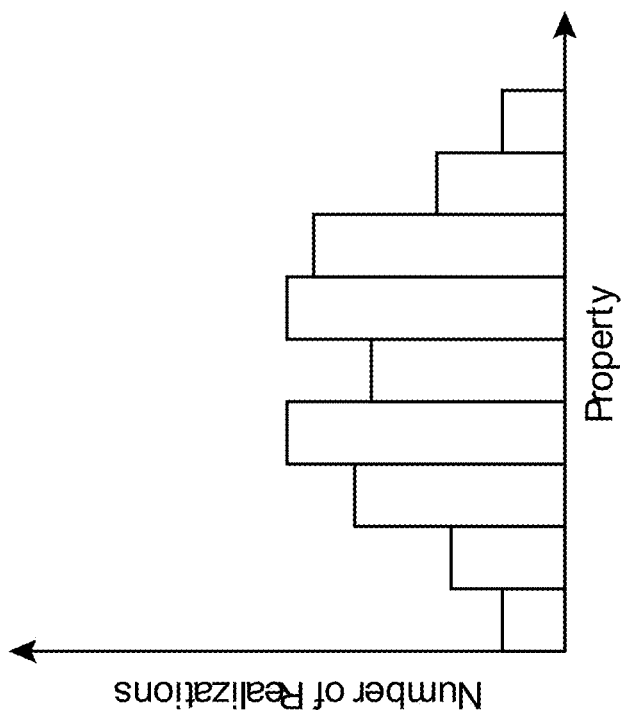
Figure 4:
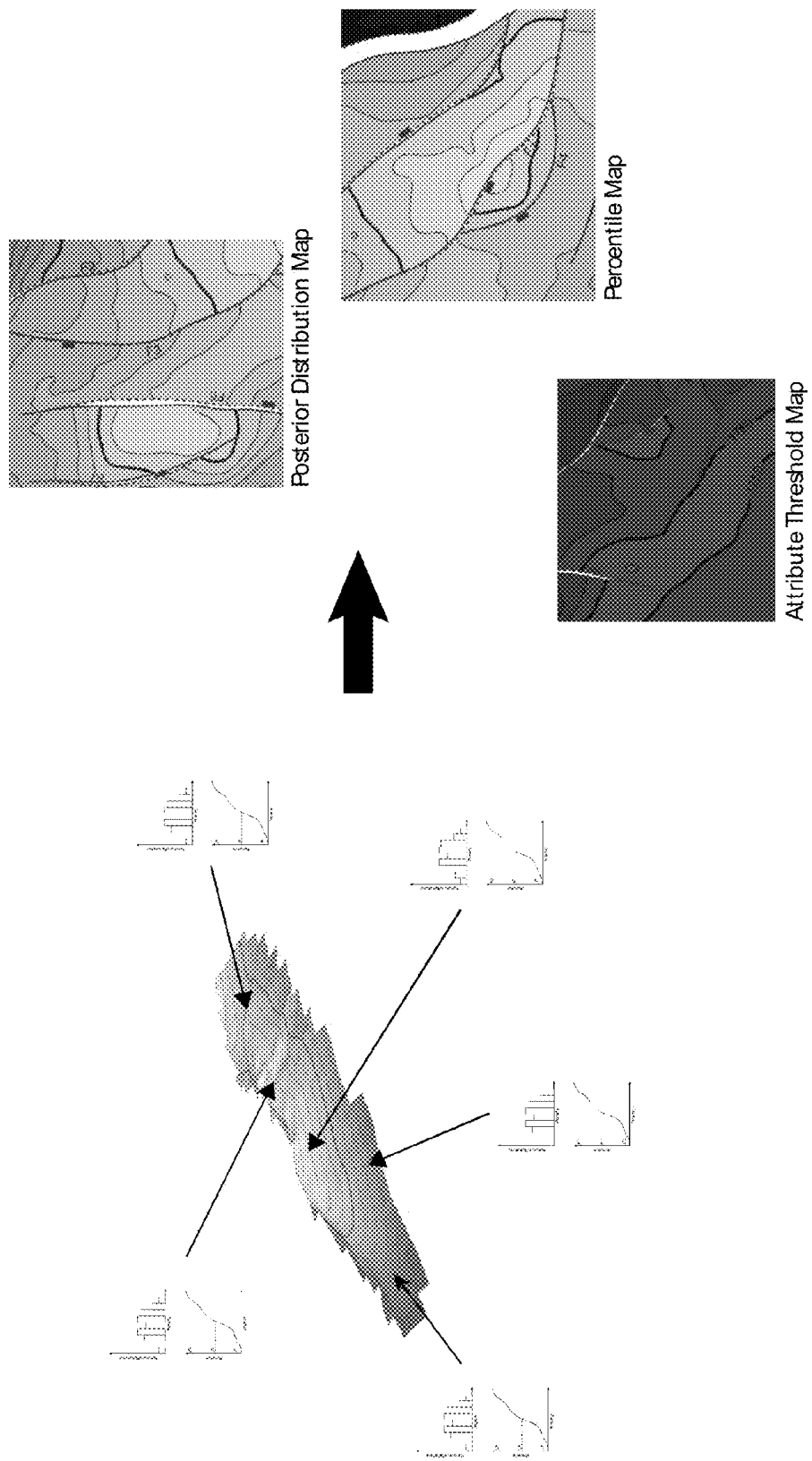
FIG. 4 illustrates an example of attribute ensembles and derivative products.

This posterior distribution could also be integrated to obtain a cumulative probability distribution of seismic amplitude, as in FIG. 3b. The cumulative probability distribution allows the determination of P10, P50, and P90 (or PX) seismic amplitude, that is to say, the seismic amplitude such that 10%, 50%, or 90% of the possible horizon configurations in the ensemble exceeds this value. This analysis can be automated and extended to the full domain of interest (composed of many individual seismic traces), giving distributions and cumulative distributions at each spatial location (FIG. 4). In this way, a map can be obtained to describe P10, P50, P90 amplitude values across an entire prospect. These may be displayed for use in hydrocarbon explorations or similar.

The posterior distribution of attribute values can be used to generate spatial mappings with designated probabilities. For example, one could map the P50 reflection amplitude associated with a given horizon, that is, the median amplitude of reflections for all points in the space. One could just as easily map the P90 reflection amplitude (90% confidence that the amplitude exceeds this value) or indeed any arbitrary probability.

More sophisticated workflows could be envisioned. For example, one could compute amplitude-vs-offset (AVO) attributes (amplitude for seismic volumes derived from subsets of shot offsets) by combining horizon reflectivity attributes described above from two different seismic volumes. The analysis then yields the probability that a given AVO anomaly exceeds a given threshold. This kind of information may be of substantial value when estimating geological risk associated with a given hydrocarbon prospect.

Thus the important aspects of the invention may be defined as a method and/or system for for attribute analysis in which an ensemble of mappings of geological features is used to obtain an ensemble of attribute values, where the geological features include subsurface horizons and/or faults. An ensemble of mappings may then be obtained from multiple interpretations of the data, each per se using known, e.g. statistical analysis methods. The ensemble of mappings is obtained via a sampling of model space as indicated by uncertainty related to a given measurement, e.g. indicating a geobody or part of a geobody, the attribute values being derived from seismic data, for example amplitude attributes, isochore attributes, or other possible metrics.

While the preferred embodiment of the invention refers specifically to the analysis of attributes generated from seismic data, it should be clear to the average worker in the energy industry or other extractive industries that the invention may also be applied to other geophysical data (or any subsurface maps or models), including but not limited to gravity data; magnetic data; magnetotelluric data; or controlled source electromagnetic data. Subsurface maps produced by interpolating well data, core data, or other geologic data may also be considered.

The method according to the invention may be used for hydrocarbon exploration/detection in which an ensemble of attribute values are used to estimate a posterior probability distribution of attribute values used to de-risk prospects. The computations are performed with the assistance of a per se known computer and associated storage hardware being provided with suitable software.

The hydrocarbon production utilizing the method may be performed by conducting a subsurface survey; interpreting the survey in such a way as to produce an ensemble of mappings; producing an ensemble of attribute values from said mappings; drilling a well at least partly based on said ensemble of attribute values; and producing hydrocarbons from the well. In this way the measurements provided in the drilling process may be used to adjust the attributes in the ensemble, thus correcting or adjusting the model of the geobodies.

Thus to summarize the present invention relates to a system mapping geological formations related to seismic studies. The system comprises interrogation means for sampling information from geological features in a mapped area, e.g. through seismic sampling methods, analysis of samples provided from electromagnetic studies etc. The interrogation means may be directly coupled sensors or measuring means but will usually be prestored information, for exampled sampled during a seismic survey. The information is stored in association with the position related to the sampled information providing a mapping of the area. The system also comprises analyzing means for obtaining attribute information related to the sampled information in each position and storing said attribute information associated to said positions so as to provide an ensemble of attribute values related to the mapped area subject to the seismic studies.

The attributes values may be related to calculated uncertainty of the sampled information and also to known geological features including subsurface horizons and/or faults.

An ensemble of mappings may then be obtained from multiple interpretations of the data, thus providing a number of alternative representations of the geological features.

The ensemble of mappings is obtained via a sampling of model space as indicated by uncertainty in a given measurement.

The attribute values may be derived from seismic data, for example amplitude attributes, isochore attributes, or other possible metrics, and/or from other geophysical data or models, for example density models or resistivity models.

The system according to the preferred embodiment of the invention may thus be based on a given group or set of possible spatial positions describing a subsurface feature, or the means with which to generate such a set, comprising an algorithm for calculating or determining said property or attribute given an individual estimate of feature position, estimates of the property at each spatial location provided by the set of positions associated with a given feature, and the subsequent use of said property estimate distributions in subsurface mapping.

The system advantageously be be used for producing hydrocarbons by conducting a subsurface survey wherein the method comprises the conducting a subsurface survey; interpreting the survey in such a way as to produce an ensemble of mappings; producing an ensemble of attribute values from said mappings; drilling a well at least partly based on said ensemble of attribute values; and producing hydrocarbons from the well.

The invention claimed is:

1. A system mapping geological formations related to seismic studies, the system comprising:
   a plurality of sensors for sampling information from geological features in a mapped area,
   storage hardware associated with a computer for storing the information in association with a position related to the sampled information providing a mapping of the area
   wherein the computer obtains attribute information related to the sampled information in each position and stores said attribute information associated to said positions thereby providing an ensemble of attribute values related to the mapped area subject to the seismic studies; and
   a display that shows the attribute values related to the mapped area for use in hydrocarbon exploration.

2. The system according to claim 1, wherein at least one of said attributes values is related to calculated uncertainty of the sampled information.

3. The system according to claim 1, wherein the geological features include subsurface horizons and/or faults.

4. The system according to claim 1, wherein an ensemble of mappings is obtained from multiple interpretations of the seismic studies.

5. The system according to claim 4, in which the ensemble of mappings is obtained via a sampling of model space as indicated by uncertainty in a given measurement.

6. The system according to claim 1, wherein the attribute values are derived from seismic data.

7. The system of claim 6, wherein the seismic data includes at least one of amplitude attributes and isochore attributes.

8. The system according to claim 1, wherein the attribute values are derived from geophysical data or models.

9. The system of claim 8, wherein the geophysical data includes at least one of density models and resistivity models.

10. The system according to claim 1, wherein feature and spatial positions describing a subsurface feature, comprising calculating means for determining said property or attribute given an individual estimate of feature position, estimates of the property at each spatial location provided by a set of positions associated with a given feature, and the subsequent use of said property estimate distributions in subsurface mapping.

11. The system according to claim 10, comprising means for generating a set of said of spatial positions describing a subsurface feature.

12. A method for using the system according to claim 1, the method comprising:
- conducting a subsurface survey;
- interpreting the survey in such a way as to produce an ensemble of mappings;
- producing an ensemble of attribute values from said mappings;
- drilling a well at least partly based on said ensemble of attribute values; and
- producing hydrocarbons from the well.

* * * * *